United States Patent
Zaiger

(10) Patent No.: US 6,325,924 B1
(45) Date of Patent: Dec. 4, 2001

(54) REACTOR VESSEL FOR REMOVING CONTAMINANTS FROM DREDGE MATERIAL IN AN UNDERWATER ENVIRONMENT

(75) Inventor: Kimo Kalani Zaiger, Somis, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/677,753

(22) Filed: Oct. 3, 2000

(51) Int. Cl.[7] .................. C02F 1/00; E02F 5/28
(52) U.S. Cl. ............ 210/170; 210/220; 210/747; 405/128.45
(58) Field of Search ................... 210/170, 209, 210/220, 242.1, 747; 405/128.45

(56) References Cited

U.S. PATENT DOCUMENTS

| | | | |
|---|---|---|---|
| 3,967,393 | * 7/1976 | Nixon | 210/170 |
| 4,133,761 | * 1/1979 | Postgate | 210/170 |
| 4,808,305 | * 2/1989 | Arnold | 210/242.1 |
| 4,944,872 | * 7/1990 | Kantor | 210/170 |
| 5,478,473 | * 12/1995 | Oshima | 210/242.1 |
| 5,549,828 | * 8/1996 | Erlich | 210/170 |
| 5,565,096 | * 10/1996 | Phelan | 210/209 |

* cited by examiner

Primary Examiner—Christopher Upton
(74) Attorney, Agent, or Firm—David Kalmbaugh

(57) ABSTRACT

A reactor vessel for in situ cleanup of contaminated sediments in an underwater environment. A slurry is generated within the reactor vessel after the reactor vessel penetrates an area of the seabed which includes severely contaminated sediments. The contaminated sediments contained within the reactor are entrained into the slurry created by a circulation pump in combination with discharge flow jets mounted in a radial network inside the reactor vessel. Anchoring vanes attached to the exterior of the reactor vessel resist torque moment induced by the slurry vortex. A remediation fluid is injected into the slurry and controlled by circulation to and from a holding/process tank of the portable surface treatment unit. Following treatment, the reactor vessel is removed from the sediment by reversing the emplacement procedure and is relocated and reset on an adjacent area.

20 Claims, 3 Drawing Sheets

REACTOR VESSEL FOR REMOVING CONTAMINANTS FROM DREDGE MATERIAL IN AN UNDERWATER ENVIRONMENT

BACKGROUND OF THE INVENTION

1. Field of the Invention

The present invention relates generally to apparatus for removing contaminants from dredge material. More specifically, the present invention relates to a reactor vessel which generates a slurry vortex to treat contaminated sediments in an underwater environment.

2. Description of the Prior Art

At present, technologies for managing contaminated dredge material in an under water environment require elaborate contaminant separation, handling, treatment and disposal facilities and processes. Innovative dredge heads have been designed during the last decade in an attempt to mitigate the environmental impact of dredging in conjunction with site specific operations for the removal of contaminants from the ocean floor and monitoring procedures for determining the level of contamination.

Nevertheless, physical removal of contaminated sediments by conventional dredging technologies invariably results in contaminant losses and off site migration due to the generation of sediment plumes and desorption of contaminants when exposed to oxidizing lacustrine or sea water. Following removal, highly contaminated dredged material can be classified as hazardous waste, requiring physical separation from "clean spoils", or non-contaminated sand and soils, special handling, ex situ treatment and/or expensive disposal in land based hazardous waste sites. The disposal of highly contaminated dredged material can be very costly, i.e., up to one thousand dollars per cubic yard. There is also the additional problem of filling land fills with contaminated sediments since these land fills generally have limited available space for hazardous waste disposal.

In many cases, severe contaminated sediments are derived from a single pollutant source, such as a shore-based industrial facility which has dumped contaminants into a nearby stream or river or directly into the lake or ocean. In these cases the contamination is often concentrated in "hot spots" in close proximity to their source.

Accordingly, there is a need to provide for a reactor vessel device which allows for in situ cleanup of highly contaminated sediment reducing "hot spot" sediment contaminant levels. Reducing "hot spot" sediment contaminant levels allows for the leaving of cleaned sediments in their place, or for the removal and disposal by conventional dredging methods with minimal environmental risk.

SUMMARY OF THE INVENTION

The present invention overcomes some of the difficulties of the past including those mentioned above in that it comprises a relatively simple yet highly effective reactor vessel for in situ cleanup of severe sediment contamination in an underwater environment.

A slurry is generated within the reactor vessel after the reactor vessel penetrates an area of the ocean floor which includes severe sediment contamination. The contaminated sediments contained within the reactor are entrained into the slurry created by a circulation pump in combination with discharge flow jets mounted in a radial network inside the reactor vessel. Anchoring vanes attached to the exterior of the reactor vessel resist torque moment induced by the slurry vortex. A remediation fluid is injected into the slurry and controlled by circulation to and from a holding/process tank of the portable surface treatment unit. Following treatment, the reactor vessel is removed from the sediment by reversing the emplacement pumping procedure and is relocated and reset on an adjacent area.

DETAILED DESCRIPTION OF THE PREFERRED ENVIRONMENT

Figure 1:
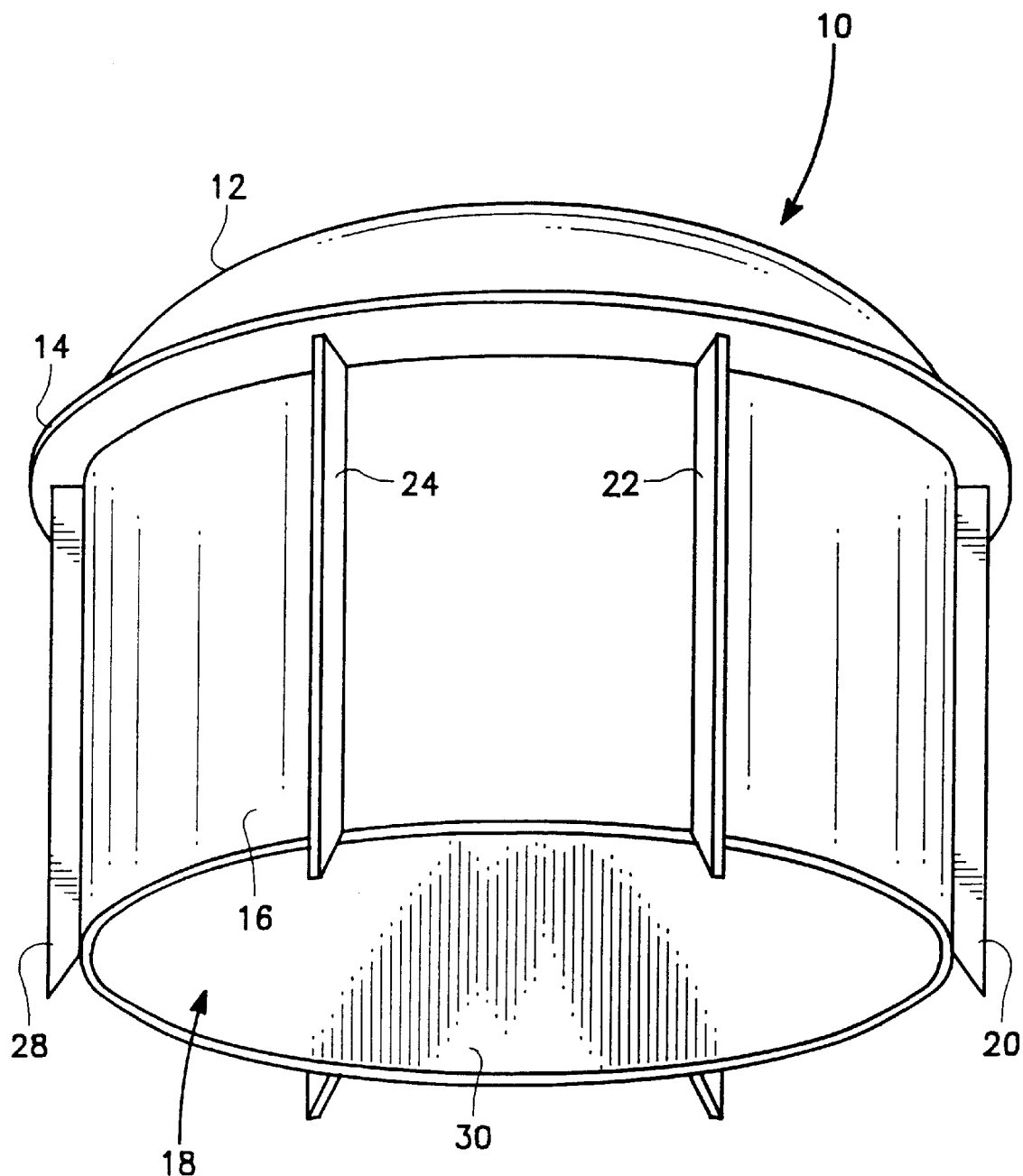
FIG. 1 is a perspective view of the reactor vessel for removing contaminants from dredge material in an under water environment which constitutes the present invention.
Figure 2:
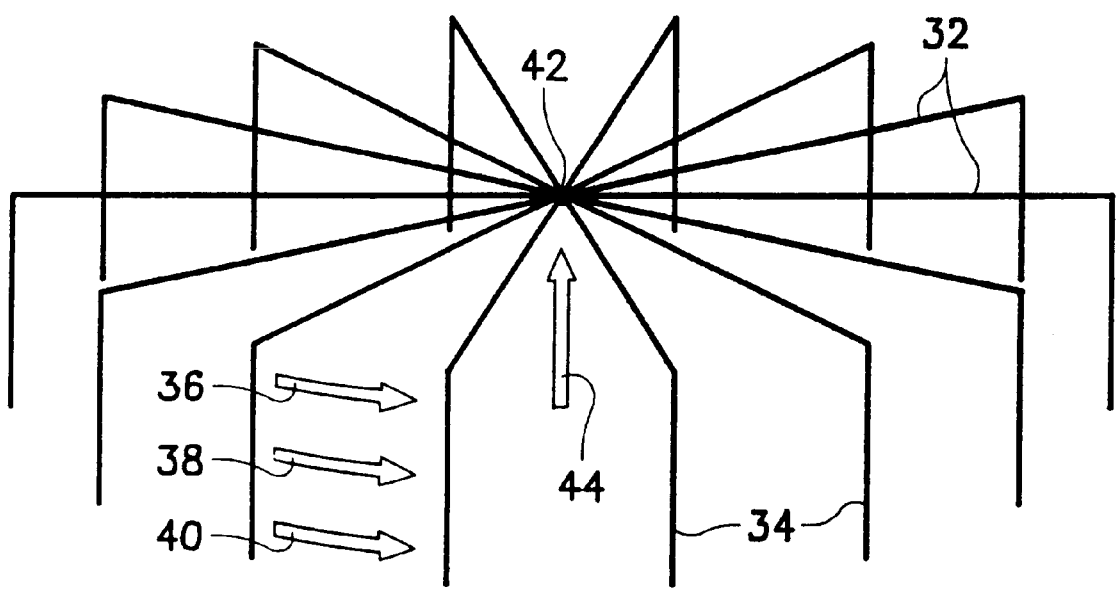
FIG. 2 is a perspective view of the fluid flow system for the reactor vessel of FIG. 1.
Figure 3:
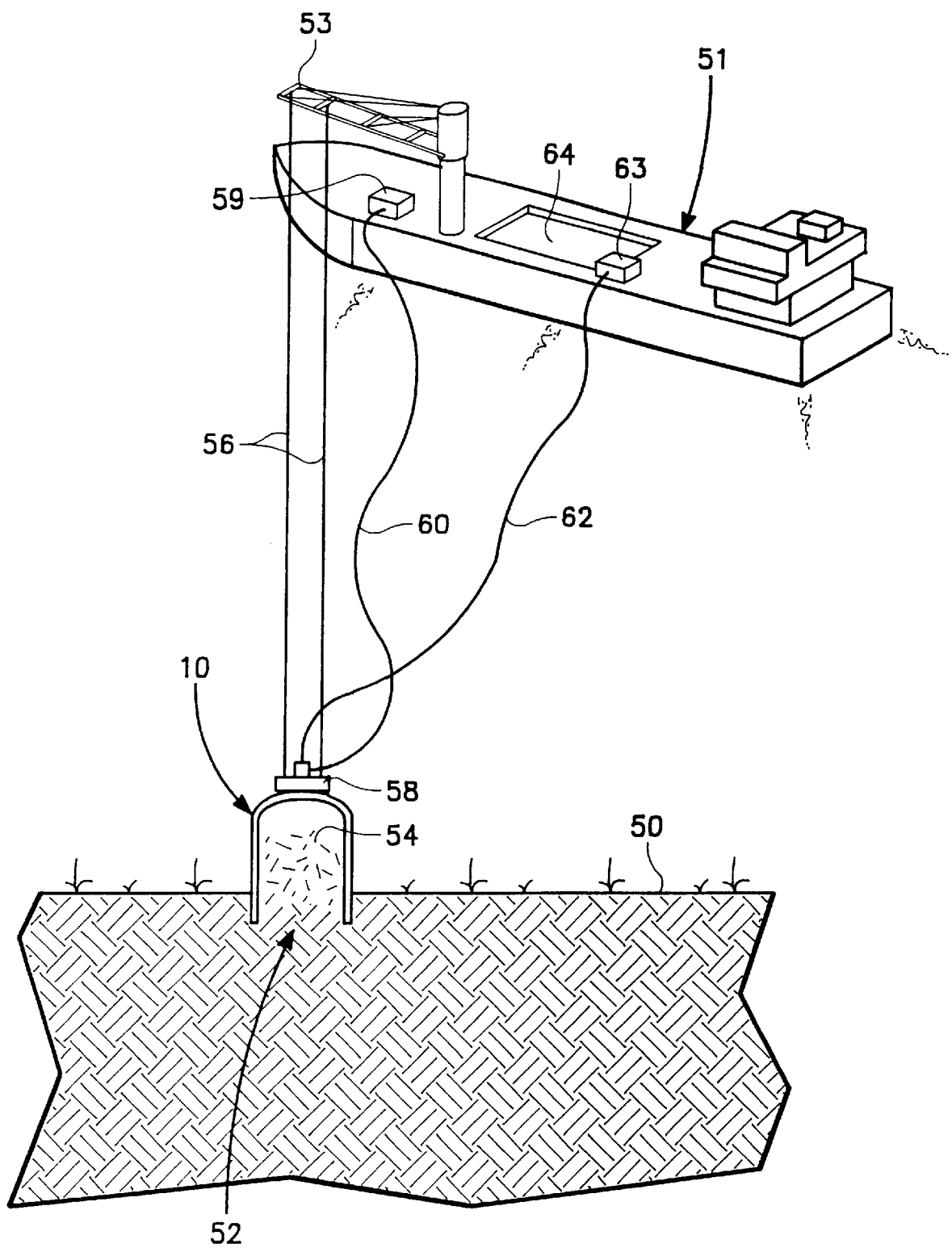
FIG. 3 is a view illustrating the reactor vessel of FIG. 1 being used in an operational environment to remediate or extract contaminants from soils and sand in a seabed.

Referring to FIGS. 1, 2 and 3, there is shown a reactor vessel, designated generally by the reference numeral 10, which can be used to efficiently perform in situ treatment of contaminated sediments at "hot spot" areas in harbors or estuaries or in other underwater environments as is best depicted in FIG. 3. The reusable reactor vessel 10 may be coupled to a portable surface remediation treatment unit that may be mounted on a barge or ship 51 (FIG. 3) or stationed on a nearby pier. A detailed description of the operation of the reactor vessels follows.

Referring to FIG. 3, the reactor vessel 10 is deployed by gently lowering the reactor vessel 10 to the sediment surface 50 which may, for example, be the ocean floor or the silty soil of a harbor or estuary. A boom 53 is mounted on the deck of ship 51 near the bow of ship 51. The boom 53, which includes a guide wire 56, is used to deploy reactor vessel 10 to a site on sediment surface 50 which is a known location of contaminated sediments and is designated generally by the reference numeral 52. Mounted on the top portion of reactor vessel 10 and affixed thereto is a pulley assembly 58 which engages guide wire 56 which, in turn, allows for the deployment and retrieval of reactor vessel 10 to and from areas of contaminated sediments 52.

Once reactor vessel 10 is positioned on the sediment surface 50, reactor vessel 10 is emplaced into the contaminated sediments 52 using suction pile technology. The contaminated sediments 52 is penetrated in a highly controlled manner, by evacuating fluid, which may be seawater or fresh water, from the interior 18 of reactor vessel 10. Withdrawing the fluid from the interior 18 of reactor vessel 10 (as indicated generally by arrow 44) creates a negative pressure within the interior 18 of reactor vessel 10 which results in the static pressure of the water column above reactor vessel 10 providing an emplacement force on reactor vessel 10 as the induced differential pressure is returned to equilibrium. The generation of this force results in the cylindrical shaped skirt 30 (FIG. 1) of reactor vessel 10 penetrating the ocean floor below sediment surface 50 to a deeper depth than the contaminated sediment layers effectively isolating the contaminated material from the surrounding soil material as shown in FIG. 3.

Referring to FIG. 3, a flexible hose line 60 which connects the interior 18 of reactor vessel 10 to a pump 59 provides a fluid passageway between the interior 18 of reactor vessel 10 and pump 59 allowing pump 59, when activated, to withdraw fluid from the interior 18 of reactor vessel 10 transferring the fluid to a holding/processing tank 64 on board ship 51. Pump 59 is mounted on the deck of ship 51 toward the bow of ship 51.

Referring to FIGS. 1 and 3, the reactor vessel 10 includes cylindrical shaped skirt 30; a dome 12 mounted on the upper end of cylindrical shaped skirt 30 and affixed thereto; and a penetration limit ring 14 attached the outer surface 16 of cylindrical shaped skirt 30 at the upper end of cylindrical shaped skirt 30. Reactor vessel 10 also has a plurality of equally spaced apart anchoring vanes 20, 22, 24 and 26 which are attached to the outer surface 16 of cylindrical shaped skirt 30. Each anchoring vane 20, 22, 24 and 26 extend outwardly from cylindrical shaped skirt 30 at an angle which is approximately ninety degrees with respect to the outer surface 16 of cylindrical shaped skirt 30. As seen in FIG. 1, the lower end of of each of the anchoring vanes 20, 22, 24 and 26 forms an angle of approximately sixty degrees with respect to a horizontal plane, thus forming a pointed edge which allows for easier penetration of reactor vessel 10 into the ocean floor in the manner shown in FIG. 3. As also seen in FIG. 1, the upper end of each of the anchoring vanes 20, 22, 24 and 26 abuts penetration limit ring 14 and is affixed thereto.

While the size and shape of the reactor vessel 10 can be adjusted to fit a specific need for in situ treatment of contaminated sediments, a typical size may be as follows: (1) a 30 ft. diameter cylindrical shaped skirt; (2) a height of 10 ft. with a sealed off top for a total reactor volume of approximately 7000 ft$^3$; and (3) a penetration depth of approximately 7 ft. before penetration limit ring 14 limits further penetration into the contaminated sediments 52 below the ocean floor 50. Reactor head space within the interior of dome 12 is maintained within reactor vessel 10 to allow sufficient volume to slurry the contaminated material, in effect creating a fluidized bed reactor that can be used with various physical systems, and chemical and biological agents to treat a wide variety of contaminants.

Referring to FIGS. 1, 2 and 3, FIG. 2 illustrates the fluid flow system for the interior of reactor vessel 10 which generates the slurry vortex of contaminated sediments 54. A circulation pump 63 mounted on the deck of ship 51 may be used as a source for providing pressurized fluid (fresh water or salt water) to the fluid flow system of FIG. 2. A flexible hose line 62 connects circulation pump 63 to the fluid flow system (FIG. 2) within the interior 18 of reactor vessel 10.

Flexible hose line 62 connects circulation pump 63 to a control manifold 42 for the fluid flow system of FIG. 2. The contaminated sediments contained within the reactor will be entrained into a slurry vortex 54 created by circulation pump 63 in combination with directional discharge flow jets (represented by arrows 36, 38 and 40) mounted in a radial network inside the reactor vessel 10. The radial network includes a plurality of horizontally positioned fluid passageways 32 extending radially outward from control manifold 42. Extending vertically downward from each fluid passageway 32 is a vertically positioned fluid passageway 34 which includes the directional discharge flow jets 36, 38 and 40.

In an alternate environment, slurry vortex 54 may be generated by submersible circulation pumps (instead of circulation pump 63) in combination with discharge flow jets 36, 38 and 40 mounted in a radial network inside the reactor vessel 10.

As the slurry 54 within the reactor vessel 10 is isolated from the surrounding waters, the physicochemistry properties of slurry 54 is controlled by the addition of reagents or removal of ions/chemical reaction by-products as a treatment fluid is recirculated. Anchoring vanes resist torque moments induced by the slurry vortex 54.

A remediation fluid is next injected into the slurry 54 via the directional discharge flow jets 36, 38 and 40 and controlled by circulation to and from a holding/process tank 64 of a portable surface treatment unit located on board ship 51. Following treatment, the reactor vessel is removed from the sediment by reversing the emplacement pumping procedure, that is pump 59 injects fluid into the interior 18 of reactor vessel 10 creating a positive pressure within interior 18 of reactor vessel 10 lifting reactor vessel 10 from contaminated sediments 52.

Reactor vessel 10 is relocated and reset on an adjacent area which may contain highly contaminated sediments.

It should be noted that reactor vessels can be designed in small sizes, to fit between pilings to remediate contaminated sediments under piers and in large sizes (30 feet or more in diameter) for general basin treatment.

From the foregoing, it may readily be seen that the present invention comprises a new, unique and exceedingly useful reactor vessel for removing contaminants from dredge material in an underwater environment which constitutes a considerable improvement over the known prior art. Many modifications and variations of the present invention are possible in light of the above teachings. It is to be understood that within the scope of the appended claims the invention may be practiced otherwise than as specifically described.

What is claimed is:

1. A reactor vessel for treating contaminated sediments from the ocean floor comprising:

a cylindrical shaped skirt having an outer surface and an interior;

a dome mounted on an upper end of said cylindrical shaped skirt and affixed thereto;

a penetration limit ring attached the outer surface of said cylindrical shaped skirt at the upper end of said cylindrical shaped skirt;

a plurality of equally spaced apart anchoring vanes attached to the outer surface of said cylindrical shaped skirt, each of said anchoring vane extending outwardly from said cylindrical shaped skirt at an angle which is approximately ninety degrees with respect to the outer surface of said cylindrical shaped skirt;

each of said anchoring vanes having an upper end abutting said penetration limit ring and a lower end which is angled forming a pointed edge allowing for penetration of said reactor vessel into the ocean floor;

a control manifold centrally located within the interior of said cylindrical shaped skirt at the upper end of said cylindrical shaped skirt;

a plurality of horizontally positioned fluid passageways extending radially outward from said control manifold; and a plurality of vertically positioned fluid passageways, each of said plurality of vertically positioned fluid passageways extending vertically downward from one of said plurality of horizontally positioned fluid passageways, each of said plurality of vertically positioned fluid passageways including a plurality of directional discharge flow jets which discharge a fluid under pressure to generate a slurry vortex of said contaminated sediments.

2. The reactor vessel of claim 1 wherein said cylindrical shaped skirt has a 30 foot diameter.

3. The reactor vessel of claim 1 wherein said reactor vessel has a height of 10 feet with a sealed off top for a total reactor volume of approximately 7000 ft$^3$.

4. The reactor vessel of claim 1 wherein said reactor vessel has a penetration depth of approximately 7 feet.

5. The reactor vessel of claim 1 wherein said plurality of anchoring vanes resist torque moments induced by said the slurry vortex.

6. The reactor vessel of claim 1 further comprises supply means for providing said liquid under pressure to said plurality of directional discharge flow jets, said supply means including a pump and a flexible hose line having one end thereof connected to said pump and an opposite end thereof connected to said control manifold.

7. A reactor vessel for treating contaminated sediments from the ocean floor comprising:

a cylindrical shaped skirt having an outer surface and an interior;

a dome mounted on an upper end of said cylindrical shaped skirt and affixed thereto;

a penetration limit ring attached the outer surface of said cylindrical shaped skirt at the upper end of said cylindrical shaped skirt;

a plurality of equally spaced apart anchoring vanes attached to the outer surface of said cylindrical shaped skirt, each of said anchoring vane extending outwardly from said cylindrical shaped skirt at an angle which is approximately ninety degrees with respect to the outer surface of said cylindrical shaped skirt;

each of said anchoring vanes having an upper end abutting said penetration limit ring and a lower end which is angled to form a pointed edge allowing for penetration of said reactor vessel into the ocean floor;

a first pump connected to the interior of said cylindrical shaped skirt, said first pump withdrawing seawater from the interior of said cylindrical shaped skirt and said dome creating a negative pressure within said reactor vessel which results in a static pressure above said reactor vessel generating an emplacement force on said reactor vessel, said emplacement force on said reactor vessel causing said reactor vessel to penetrate into the ocean floor;

a control manifold centrally located within the interior of said cylindrical shaped skirt at the upper end of said cylindrical shaped skirt;

a plurality of horizontally positioned fluid passageways extending radially outward from said control manifold;

a plurality of vertically positioned fluid passageways, each of said plurality of vertically positioned fluid passageways extending vertically downward from one of said plurality of horizontally positioned fluid passageways, each of said plurality of vertically positioned fluid passageways including a plurality of directional discharge flow jets which discharge a fluid under pressure to generate a slurry vortex of said contaminated sediments; and a second pump connected to said control manifold to provide said fluid under pressure through said control manifold and said horizontally positioned fluid passageways to the directional discharge flow jets within said vertically positioned fluid passageways.

8. The reactor vessel of claim 7 wherein said cylindrical shaped skirt has a 30 foot diameter.

9. The reactor vessel of claim 7 wherein said reactor vessel has a height of 10 feet with a sealed off top for a total reactor volume of approximately 7000 ft$^3$.

10. The reactor vessel of claim 7 wherein said reactor vessel has a penetration depth of approximately 7 feet.

11. The reactor vessel of claim 7 wherein said reactor vessel includes a first flexible hose line having one end thereof connected to said first pump and an opposite end thereof connected to the interior of said cylindrical shaped skirt.

12. The reactor vessel of claim 7 wherein said reactor vessel includes a second flexible hose line having one end thereof connected to said second pump and an opposite end thereof connected to said control manifold.

13. The reactor vessel of claim 7 wherein said plurality of anchoring vanes resist torque moments induced by said the slurry vortex.

14. A reactor vessel for treating contaminated sediments from the ocean floor comprising:

a cylindrical shaped skirt having an outer surface and an interior;

a dome mounted on an upper end of said cylindrical shaped skirt and affixed thereto;

a penetration limit ring attached the outer surface of said cylindrical shaped skirt at the upper end of said cylindrical shaped skirt;

a plurality of equally spaced apart anchoring vanes attached to the outer surface of said cylindrical shaped skirt, each of said anchoring vane extending outwardly from said cylindrical shaped skirt at an angle which is approximately ninety degrees with respect to the outer surface of said cylindrical shaped skirt;

each of said anchoring vanes having an upper end abutting said penetration limit ring and a lower end which is angled to form a pointed edge allowing for penetration of said reactor vessel into the ocean floor;

a first pump connected to the interior of said cylindrical shaped skirt, said first pump withdrawing seawater from the interior of said cylindrical shaped skirt and said dome creating a negative pressure within said reactor vessel which results in a static pressure above said reactor vessel generating an emplacement force on said reactor vessel, said emplacement force on said reactor vessel causing said reactor vessel to penetrate into the ocean floor to said contaminated sediments;

a control manifold centrally located within the interior of said cylindrical shaped skirt at the upper end of said cylindrical shaped skirt;

a plurality of horizontally positioned fluid passageways extending radially outward from said control manifold;

a plurality of vertically positioned fluid passageways, each of said plurality of vertically positioned fluid passageways extending vertically downward from one of said plurality of horizontally positioned fluid passageways, each of said plurality of vertically positioned fluid passageways including a plurality of directional discharge flow jets which discharge a fluid under pressure to generate a slurry vortex of said contaminated sediments; and a second pump connected to said control manifold to provide said fluid under pressure through said control manifold and said horizontally positioned fluid passageways to the directional discharge flow jets within said vertically positioned fluid passageways;

said second pump supplying reagents through said control manifold and said horizontally positioned fluid passageways to the directional discharge flow jets within said vertically positioned fluid passageways;

said directional discharge flow jets discharging said reagents into said slurry vortex to initiate a treatment of said contaminated sediments; and said first pump supplying said seawater to the interior of said reactor vessel following said treatment of said contaminated sediments to generate a positive pressure within said reactor vessel lifting said reactor vessel above the ocean floor allowing said reactor vessel to be transferred a different location within said underwater environment.

15. The reactor vessel of claim 14 wherein said cylindrical shaped skirt has a 30 foot diameter.

16. The reactor vessel of claim 14 wherein said reactor vessel has a height of 10 feet with a sealed off top for a total reactor volume of approximately 7000 ft$^3$.

17. The reactor vessel of claim 14 wherein said reactor vessel has a penetration depth of approximately 7 feet.

18. The reactor vessel of claim 14 wherein said reactor vessel includes a first flexible hose line having one end thereof connected to said first pump and an opposite end thereof connected to the interior of said cylindrical shaped skirt.

19. The reactor vessel of claim 14 wherein said reactor vessel includes a second flexible hose line having one end thereof connected to said second pump and an opposite end thereof connected to said control manifold.

20. The reactor vessel of claim 14 wherein said plurality of anchoring vanes resist torque moments induced by said the slurry vortex.

* * * * *